United States Patent [19]

Braukmann

[11] 4,216,902
[45] Aug. 12, 1980

[54] THERMOSTATIC CONTROL VALVE

[75] Inventor: Heinz W. Braukmann, Willowdale, Canada

[73] Assignee: Braukmann Armaturen AG, Rothrist, Switzerland

[21] Appl. No.: 889,246

[22] Filed: Mar. 23, 1978

[51] Int. Cl.² ............................................. F24F 11/08
[52] U.S. Cl. ..................................... 236/42; 236/99 D
[58] Field of Search ..................... 236/42, 43, 99 D; 251/11; 137/468

[56] References Cited

U.S. PATENT DOCUMENTS

| | | | |
|---|---|---|---|
| 1,756,688 | 4/1930 | Hutchinson | 251/11 X |
| 2,045,332 | 6/1936 | Otto | 236/42 X |
| 3,650,505 | 3/1972 | Drexel | 251/11 |
| 3,813,035 | 5/1974 | Wobig | 236/43 X |
| 4,089,461 | 5/1978 | Gocke | 236/100 X |

Primary Examiner—Albert J. Makey
Assistant Examiner—William E. Tapolcai, Jr.
Attorney, Agent, or Firm—W. T. Howell

[57] ABSTRACT

A thermostatically controlled valve for heated fluid flowing through a conduit has a valve seat and cooperating valve mechanism to permit the flow of fluid through the seat; a housing, open at one end, is secured to the conduit at the other end over the valve mechanism. A sensor, secured in the open end of the housing, is responsive to change in ambient temperature of the air above the housing and the sensor operates a plunger which acts on the valve mechanism to regulate the flow through the said seat. Thermal shielding means are provided in the housing between the sensor and the valve mechanism to prevent heat from the latter affecting the sensor and vents are provided in the housing below the thermal shielding means to allow air heated by the valve mechanism to escape to atmosphere.

4 Claims, 1 Drawing Figure

THERMOSTATIC CONTROL VALVE

FIELD OF INVENTION

This invention relates to thermostatic control valves and more particularly to such valves which are connected to radiators to control the temperature of a room heated thereby.

PRIOR ART

It is obvious that if a control valve of this nature is to work properly then it should be subjected only to the ambient temperature of the circulating air in the heated room and not influenced directly by the heat emanating from the radiator to which the valve is connected. However, it has been found that such a valve only operates properly in a horizontal position and if the thermostat is built into the handle. For installations with a thermostatic control valve located in a vertical position, a remote sensor has to be used to provide proper control or even a remote control handle with accessory piping.

The problem is that the built in thermostat of the valve is influenced more by the warm air emanating from the heating source, i.e. the radiator, than by the ambient temperature of circulating air above the thermostatic element and this is due to entrapment of heated air in the valve assembly, which entrapped air directly influences the thermostatic element.

SUMMARY OF THE INVENTION

It is an object of the invention to provide a thermostatic control valve which will work as intended to control the temperature of a room through response to the ambient temperature of circulating air and whether the valve is installed in a horizontal or vertical position adjacent to the heat source, such as a radiator.

The invention consists in providing a thermostatic control valve wherein the influence of entrapped air heated by the radiator on the thermostat is practically eliminated. This is achieved by opening up and venting the space between the valve body, which permits flow of the heating medium and the control assembly containing the sensor. Furthermore, the sensor is heat insulated from the space so provided and the sensor located above the heat insulation is open to the effect only of the ambient air temperature.

BRIEF DESCRIPTION OF THE DRAWING

The invention will now be described in relation to the accompanying drawing, which is a cross sectional view of a thermostatic control valve constructed according to a preferred embodiment of the invention.

DESCRIPTION OF A PREFERRED EMBODIMENT

Figure 1:
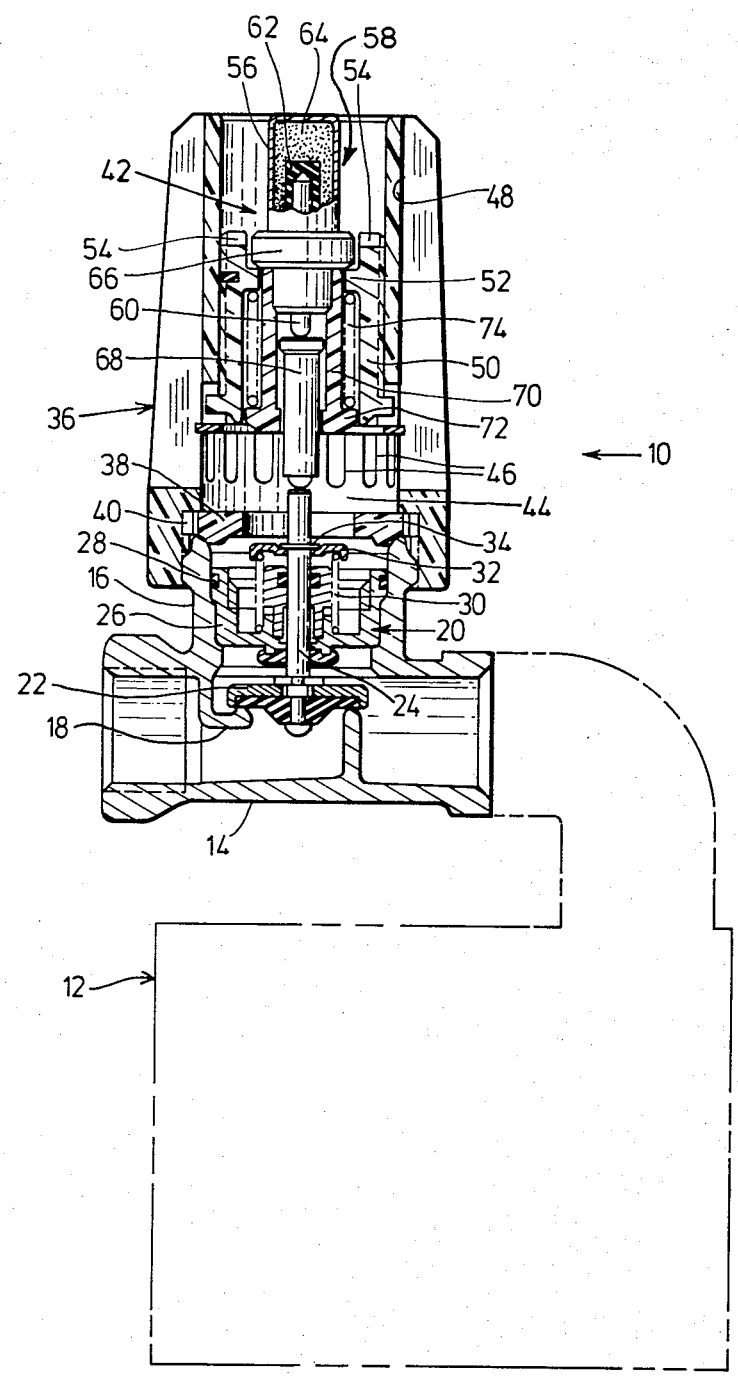

The valve structure of the invention, generally denoted by the numeral 10, is shown as constructed for threaded connection to a radiator 12, illustrated in block outline only, positioned adjacent the valve structure 10. The threaded connector may be of angular configuration but for the purpose of illustration it is shown in the drawing as a section 14 of a straight line conduit, one end of which is connected to the radiator 10 with the other end connected to a source, not shown, which supplies heated fluid to the radiator.

The conduit section 14 has a spigot 16 extending above a valve seat 18 located in the conduit section 14. The spigot 16 encloses a valve mechanism, generally denoted by the numeral 20, comprising a valve plate 22, which engages the valve seat 18 on movement of a valve stem 24 carrying the valve plate 22. A valve stem guide 26 provided with a seal 28 is threaded into the spigot 16 and the lower end of a valve spring 30, which surrounds the valve stem 24, bears against the upper surface of the valve guide 26 as illustrated. The upper end of a valve spring 30 bears against a valve plate 32 which is secured in place by a circlip 34.

An open ended housing, generally denoted by the numeral 36, is secured to the spigot 16. This can be effected by conventional threaded connection but preferably a locking engagement is used which consists of an annular washer 38 having pawls which engage with the inner teeth of a ring 40, as more fully described in my continuation-in-part application Ser. No. 850,691 filed on Nov. 11, 1977.

The interior of the housing 36 contains a thermostatic control assembly, generally denoted by the numeral 42, which is pre-assembled in the housing 36 before its engagement with the spigot 16 in the manner already described. The thermostatic control assembly 42 is spaced apart from the spigot 16 to provide a space 44 in the housing 34 which is vented by slits 46 in the wall 48 of the housing 36.

Above the slits 46, the interior of the wall 48 of the housing 36 is threaded to receive an externally threaded sleeve 50 which has an inwardly extending shoulder 52 adjacent its upper end. The upper surface of the sleeve 50 has diametrically opposed recesses 54 which permit engagement of a key, not shown, with the recesses 54 to permit rotatable adjustment of the position of sleeve 50 in the housing 36. The sleeve 50 is of material having low heat conductivity, such as plastic.

The control assembly 42 also includes a casing 56, the upper part of which contains a thermostatic sensor, generally denoted by the numeral 58, and responsive to changes in ambient temperature of the air entering the open end of the housing 36.

The thermostatic sensor 58 may be constructed in many ways, but a particularly favoured construction, as illustrated, shows a movable plunger 60 extending from the casing 56 and operable through the combined action of a surrounding rubber casing 62 enveloped by wax 64 as more fully described in my continuation-in-part application Ser. No. 850,691 filed on Nov. 11, 1977.

The casing 56 is enlarged at 66 to provide a collar which bears against the upper surface of the shoulder 52 of the sleeve 50.

The free end of the plunger 60 acts on a cylinder 68 which, in turn, acts on the free end of the valve stem 24 extending into the housing 36 from the spigot 16. The cylinder 66 is made of material having low heat conductivity, such as plastic.

The casing 56 below the collar 66 is threaded to receive a sleeve 70 which is spaced from the sleeve 50 as illustrated in the drawing. The lower end of the sleeve 70 has an outwardly extending shoulder 72. An overriding spring 74 is located in the space between the sleeves 50 and 70 to the upper and lower ends of the spring 74 bearing respectively against the shoulder 52 and 72. Apart from positioning the casing 56 the spring 74 acts as a relief if the temperature of the thermostatic sensor 58 rises inordinately.

The sleeve 70 is made of material having low heat conductivity such as plastic and it will be noted that the sleeves 50 and 70, with the cylinder 68, terminated at their lower ends adjacent to the upper end of the slits 46 and, being made of plastic, they provide a thermal shield for the sensor 58. Also since the heated air provided by the valve mechanism 20 is dissipated though the slits 46 it will be appreciated that the sensor 58 is effected only by the air convecting into the open end of the housing, which convection is encouraged by the rise of the warmer air escaping through the slits 46 and ascending outside the housing 36.

I claim:

1. A thermostatically controlled valve for heated fluid flowing through a conduit has a valve seat and cooperating valve mechanism to permit the flow of fluid through said seat in said conduit, a housing open at one end, and adapted for securement to said conduit at the other end over said valve mechanism, a sensor secured in said open end of said housing and responsive to change in ambient temperature of the air above said housing, movable means in said housing responsive to the action of said sensor and operable on said valve mechanism to regulate said flow through said seat, thermal shielding means in said housing below said sensor to prevent heat from the said valve mechanism effecting said sensor and air vents in said housing below said thermal shielding means to allow air heated by said valve mechanism to escape to atmosphere.

2. A thermostatic control valve according to claim 1 wherein said thermal shielding means is made of plastic.

3. A thermostatic control valve according to claim 2 wherein said thermal shielding means includes a sleeve, adapted for threaded securement to the internal wall of said housing, said sleeve being rotatably operable on said valve mechanism for adjustment thereof.

4. A thermostatic control valve according to claim 3 wherein said means operable on said valve mechanism has a plunger, said valve mechanism has a valve plate co-operating with said valve seat and said plate is secured to a valve stem extending into said housing, the free end of said plunger bearing against the upper end of said valve stem.

* * * * *